Figure 1:
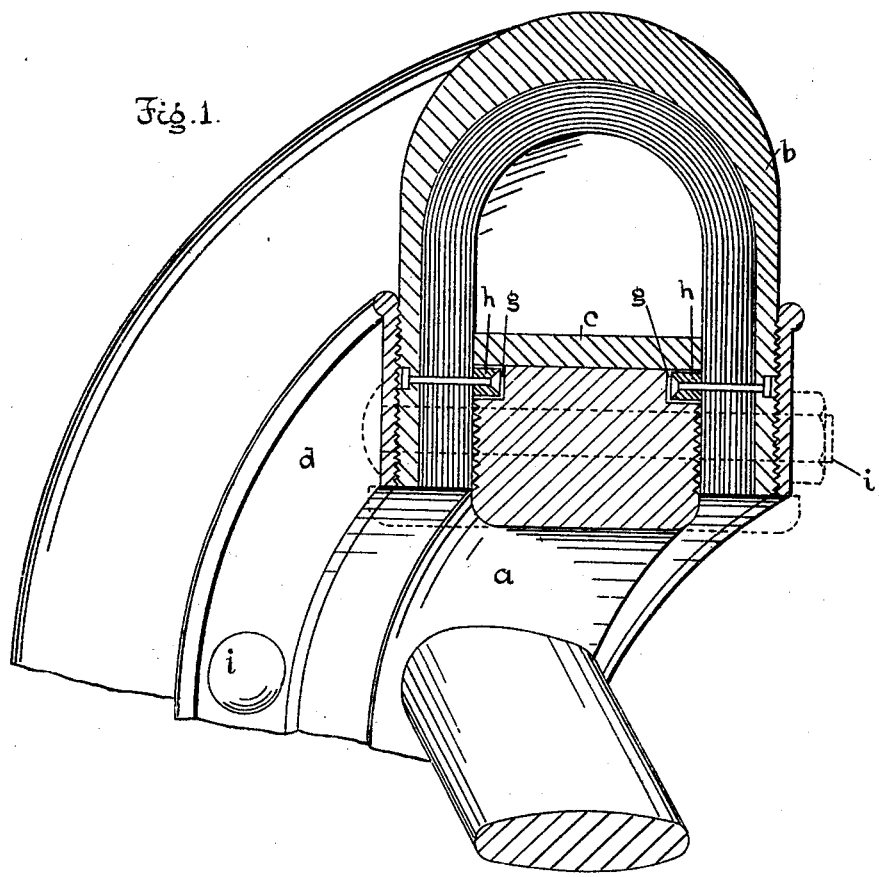

No. 692,341. Patented Feb. 4, 1902.
G. W. PITT & E. MARTIN.
WHEEL AND TIRE FOR VEHICLES.
(Application filed June 17, 1901.)
(No Model.) 2 Sheets—Sheet 1.

Witnesses:
Fred W. Englert
Percy C. Bowen

Inventors:
George W. Pitt
Edward Martin
by Wilkinson & Fisher
Attorneys.

No. 692,341. Patented Feb. 4, 1902.
G. W. PITT & E. MARTIN.
WHEEL AND TIRE FOR VEHICLES.
(Application filed June 17, 1901.)

(No Model.) 2 Sheets—Sheet 2.

Witnesses:
Fred W. English
Percy C. Bower

Inventors:
George W. Pitt,
Edward Martin,
by Wilkinson & Fisher
Attorneys.

UNITED STATES PATENT OFFICE.

GEORGE WATERS PITT AND EDWARD MARTIN, OF LONDON, ENGLAND.

WHEEL AND TIRE FOR VEHICLES.

SPECIFICATION forming part of Letters Patent No. 692,341, dated February 4, 1902.

Application filed June 17, 1901. Serial No. 64,909. (No model.)

*To all whom it may concern:*

Be it known that we, GEORGE WATERS PITT, residing at 62 Welbeck street, London, and EDWARD MARTIN, residing at 27 Park Lane, Stoke Newington, London, England, subjects of the King of Great Britain and Ireland, have invented Improvements in or Relating to Wheels and Tires for Vehicles, (for which we have made applications for patents in Great Britain, No. 20,846, bearing date November 19, 1900, and No. 1,056, bearing date January 16, 1901,) of which the following is a specification.

This invention relates to improvements in wheels and tires for vehicles.

According to this invention we provide a ring or band of india-rubber or other suitable material, preferably of U form in cross-section.

The felly of the wheel, which we prefer to make of wood, is formed on its two sides with serrations running alternately radially and circumferentially. A steel band forming the ordinary tire comes around the wooden felly. This band is the same width as the felly. An annular groove is formed by cutting away a portion of the wood or other material of which the felly is formed for the purpose hereinafter described. The U-shaped band of india-rubber is provided with pieces of metal or other suitable material, which may be square in cross-section, shaped to conform to the annular groove aforesaid, into which they take when the tire is in position. These pieces are riveted or otherwise suitably fastened to the interior of the rubber at intervals. We provide a flat metal ring on either side of the felly. This ring is sufficiently broad to hold the edges of the band tightly in position and compress the edges of this band into the aforesaid serrations on the felly when held by bolts fastened through holes in the aforesaid rings, rubber band, and felly and secured by nuts. These flat metal rings instead of being in one piece may be built up in sections. We may provide the interior of the rubber band with an air-tube or the air may be pumped into the interior of the U-shaped band, suitable means being provided to insure a perfect air-seal. We may in some cases provide the outer surface of the aforesaid steel band (or ordinary tire) or the surface on which the air-tube rests with grooves (preferably waved) to prevent lateral displacement or "creeping" of the air-tube.

In order that our said invention may be understood, we will describe the same with reference to the accompanying drawings, in which—

Figure 2:
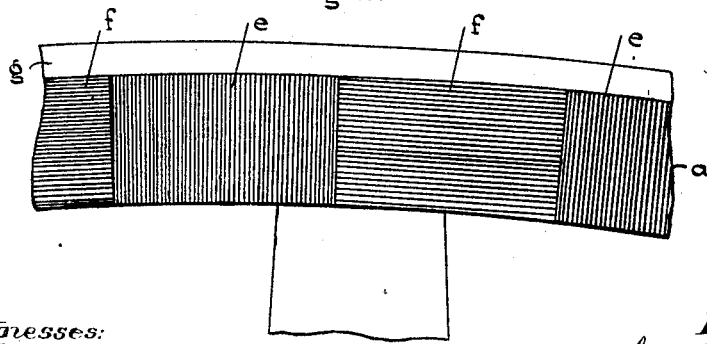
Figures 3, 4:
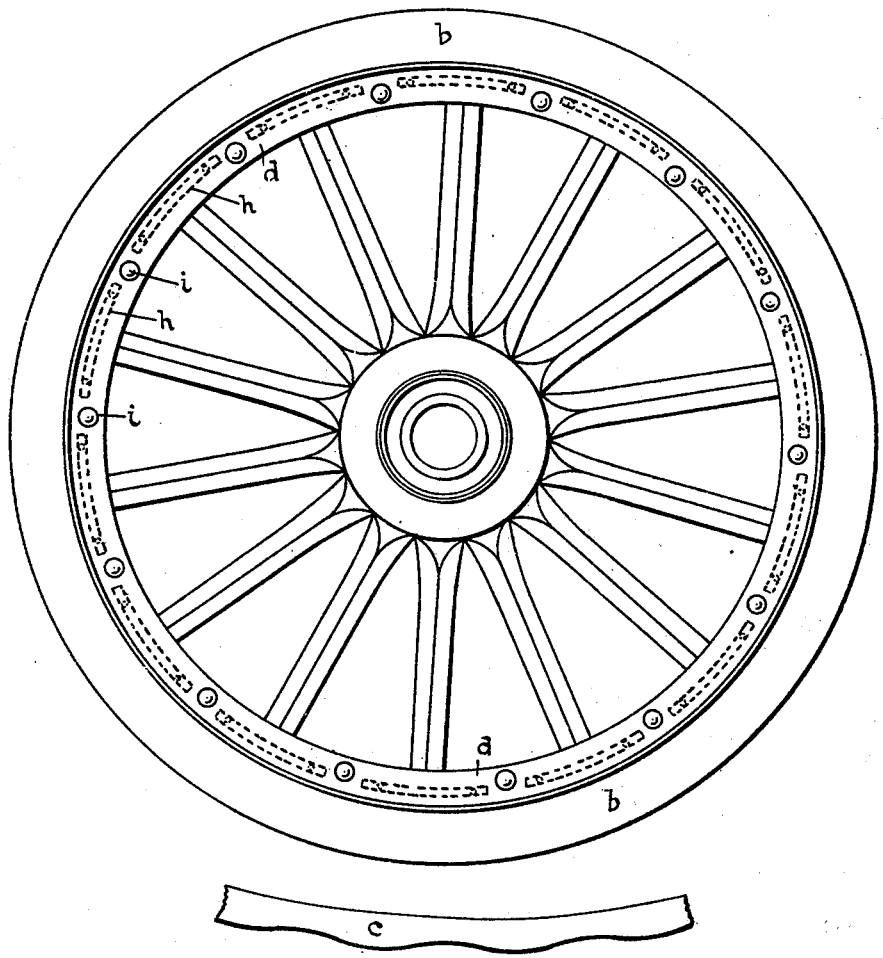

Figure 1 shows a perspective view of a section of the tire and felly. Fig. 2 shows a side view of a portion of the felly with serrations. Fig. 3 shows elevation of wheel with tire fitted thereto. Fig. 4 shows a portion of steel band or ordinary tire. Fig. 3 is drawn to a scale smaller than that of Figs. 1, 2, and 4.

The same letters of reference denote the same parts in all the views.

*a* shows the felly; *b*, the U-shaped band of rubber or other suitable material; *c*, the steel tire, and *d d* flat metal rings. Serrations running alternately radially (*e*) and circumferentially (*f*) are formed on the two sides of the felly *a*, as shown at Figs. 1 and 2.

*g* shows an annular groove on each side of the felly *a*.

*h* shows pieces of metal riveted at intervals to the inner face of the band *b* and shaped to conform to the annular grooves aforesaid, into which they take, as shown.

*i* shows bolts passing through holes in the flat metal rings *d*, band *b*, and felly *a* and compressing the band *b* between the rings and felly.

The inner surface of each ring *d* may be provided with serrations, as shown in section at Fig. 1. The outer surface of the steel tire *c* may be of undulatory form, as shown at Fig. 4. We may in some cases form thickened edges on the outer edges of the rubber band, such thickened edges coming behind the inner circumferences of the flat metal rings. We may employ an inner tube. We may form it partly of rubber and partly of canvas in such a way that the canvas portion will rest on the steel tire when the tube is in position. The other pure rubber portion when the air tube is inflated takes the shape of the U-shaped band. Further, instead of providing the felly of the wheel with serrations, radial and circumferential, we may form or fix on the sides of the felly projections or indentations of any suitable form, preferably of a conical form. In some cases we may also provide the flat metal ring referred to with similar projections or indentations. In either case when the ring is bolted in position the rubber of the outer cover (or U-shaped band) is forced onto the projections or into the indentations aforesaid, thus holding the cover firmly in position and preventing creeping.

What we claim as our invention, and desire to secure by Letters Patent, is—

1. The combination with a wheel, a felly having serrations upon each side, and a pair of serrated rings; of a waved or corrugated steel tire upon the outer face of said felly opposite the tread of the tire, to prevent creeping of the same, and a rubber tire adapted to fit on said felly and adapted to be clamped between said rings and felly by through-bolts, substantially as described.

2. The combination with a wheel, a serrated felly provided with an annular groove upon each side encircling said wheel, a waved or corrugated steel tire encircling said felly, and serrated rings upon each side of said felly; of a rubber tire U-shaped in cross-section, adapted to have its ends clamped between said serrated felly and said serrated rings, and retaining-blocks riveted at intervals around said rubber tire, said blocks being adapted to rest in said annular grooves, substantially as described.

GEORGE WATERS PITT.
EDWARD MARTIN.

Witnesses:
A. E. VIDAL,
A. BROWNE.